UNITED STATES PATENT OFFICE.

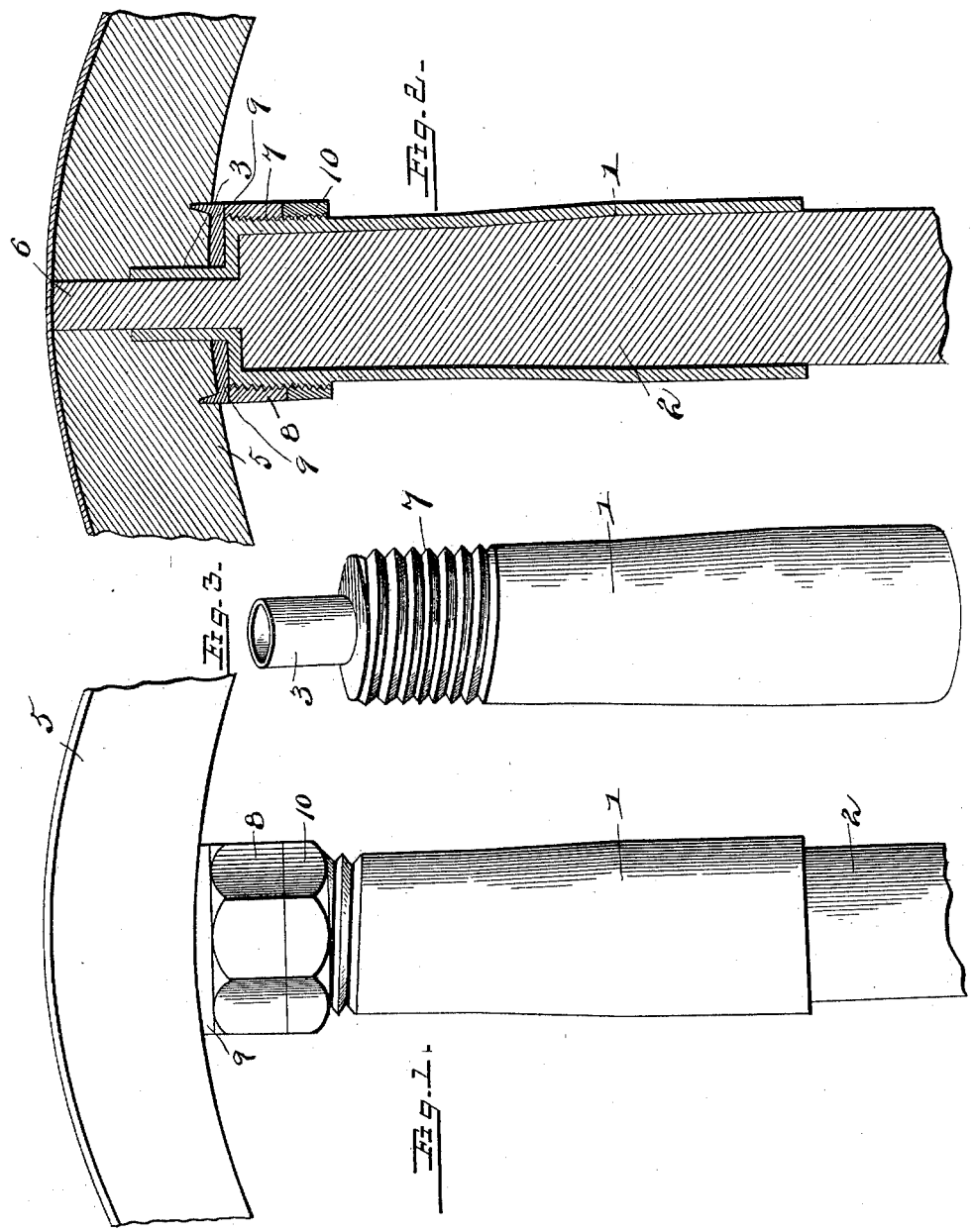

AUGUST JOHNSON AND JOHN D. CAHILL, OF McNEIL, TEXAS, ASSIGNORS OF ONE-THIRD TO A. F. MARTIN, OF SAME PLACE.

TIRE-TIGHTENER.

SPECIFICATION forming part of Letters Patent No. 600,479, dated March 8, 1898.

Application filed April 20, 1897. Serial No. 633,041. (No model.)

*To all whom it may concern:*

Be it known that we, AUGUST JOHNSON and JOHN D. CAHILL, citizens of the United States, residing at McNeil, in the county of Travis and State of Texas, have invented a new and useful Tire-Tightener, of which the following is a specification.

Our invention relates to tire-tighteners, and particularly to a spoke-socket and means for adjusting the same to take up looseness of both spokes and felly; and the object in view is to provide a simple and compact construction and arrangement of parts adapted for application to a spoke of the ordinary construction without material modification, such ordinary construction of spoke involving a comparatively uniform diameter from the hub to the shoulder, which is adapted to bear against a washer on the inner surface of the rim or felly, a tenon extending centrally from said shoulder and fitting in a mortise in the rim. We are aware that spoke-sockets having adjustable parts to provide for tightening the rim as well as the spokes have been used heretofore; but, as above indicated, it is our object to construct a device of this class with such a relative arrangement of parts as to be applicable to a spoke of the ordinary construction without shaping it specially to suit the socket.

In carrying out our invention we employ a sleeve or socket portion of an interior diameter corresponding with the diameter of the contiguous end of the spoke and having a reduced tubular extension for the reception of the tenon, said extension closely fitting the tenon and extending therewith into the mortise in the rim. Thus the shoulder between the end of the body portion of the spoke and the tenon bears against the offset between the body portion of the socket or sleeve and its extension, thereby covering the end of the grain to prevent moisture from reaching the same and also forming a firm bearing for the end of the spoke, such bearing remaining the same in all adjustments of the parts from the fact that the adjusting devices are applied exteriorly to the sleeve or socket and serve to adjust the sleeve without affecting its position with relation to the spoke.

Other objects and advantages of this invention will appear in the following description, and the novel features thereof will be particularly pointed out in the appended claim.

In the drawings, Figure 1 is a side view of a spoke-socket constructed in accordance with our invention. Fig. 2 is a sectional view of the same. Fig. 3 is a detail view of the same detached.

Similar numerals of reference indicate corresponding parts in all the figures of the drawings.

The body portion of the device embodying our invention consists of a tubular socket or sleeve 1 of a diameter adapted to receive the outer end of the body portion of a spoke 2, and the outer end of this sleeve is contracted to form a tubular extension 3, interiorly proportioned to receive a tenon 6, integral with the spoke and of the ordinary construction well known in the art, said extension 13 being adapted to fit in the mortise formed in the rim 5 of a wheel for the reception of the spoke-tenon. Obviously said mortise must be slightly counterbored to receive the extension 3, but otherwise the contruction remains the same as when the shoulder or offset at the outer extremity of the body portion of the spoke bears against the inner surface of the rim with only a washer or its equivalent interposed. In the construction illustrated we have shown a washer 9 arranged between the offset outer end of the sleeve 1 and the inner surface of the rim, said washer being preferably spurred to engage the surface of the rim and being fitted around the tubular extension 3 of the sleeve.

From the above description it will be seen that a spoke of the ordinary construction may be fitted into the sleeve or socket portion of the improved tire-tightener without modification as to either construction or proportions, and that when thus seated the end of the grain at the shoulder between the body portion and the tenon is completely covered, and thus protected from moisture to avoid the decay incident to such exposure, as is also well known in the art. Furthermore, the extension 3 protects the tenon to a point well within the mortise of the rim and at the same time is adapted to bear a large proportion of the strain applied to the tenon by reason of the use of the wheel. It is well known that a spoke is more liable to break at the base of the tenon or at the shoulder between the body portion of the spoke and the tenon, and, therefore, in constructing the socket we have adapted its body portion to receive the body portion of the spoke and extend inwardly a considerable distance to firmly seat said body portion. Hence the extension 3, which receives the tenon, serves to vastly strengthen the structure at that point where a spoke is most liable to be fractured by strain.

Various means may be employed for relatively adjusting the sleeve 1 and the washer 9 in order to secure the desired tightening of the rim and tire; but in the construction illustrated an adjusting-nut 8 is threaded exteriorly, as at 7, upon the body portion of the sleeve 1, contiguous to the outer end, and bears at its outer edge upon the surface of the washer, an additional or jam-nut 10 being mounted upon said sleeve at the inner edge of the adjusting-nut to lock the latter against accidental displacement. The washer 9 is preferably of a diameter equal with the adjusting-nut, whereby the peripheral spurs of said washer come under and directly in alinement with the adjustment of the nut 8.

It will be seen that the outward adjustment of the nut 8 will cause an outward pressure upon the washer or bearing-plate 9, by which pressure is communicated to the inner surface of the rim, while inward pressure is communicated to the sleeve 1 and by it to the shoulder at the outer end of the body portion of the spoke. Hence the adjustment of the spoke or rim does not materially change the relative positions of the parts from the fact that the extension 3 remains in the mortise of the rim and thus protects and strengthens the tenon, while the interval which may be formed between the offset outer end of the sleeve and the bearing-plate 9 is completely covered and concealed by the adjusting-nut, the latter in turn being held in place by the jam-nut 10. Therefore it will be seen that after repeated adjustment of the parts to suit changes in the wheel due to various causes there will be no visible change in the appearance of the socket, except, perhaps, as to the extent of exposure of the threaded portion 7. Therefore the appearance of a wheel of which the spokes are fitted with the improved socket is not materially affected by the greater or less adjustment of the various sockets.

Having described our invention, what we claim is—

In a tire-tightener, the combination of a tubular spoke-socket or sleeve, having an interior diameter equal with and adapted to receive the body portion of a terminally-tenoned spoke and extend inwardly from the shoulder at the base of the tenon, and having an outward reduced tubular extension to receive and embrace the tenon of the spoke and extend into the mortise of a wheel-rim, the offset portion or shoulder, between the body portion of the socket and said extension, forming a seat for the shoulder at the base of the spoke-tenon, whereby the spoke is strengthened at said shoulder against lateral strains, a bearing-plate fitted to slide upon and guided by said extension of the socket, and extending peripherally beyond the exterior surface of the body portion of the socket or sleeve, an adjusting-nut threaded exteriorly upon the outer end of the body portion of the socket, to close the interval between the shoulder of the socket and the bearing-plate, and corresponding in exterior diameter with said bearing-plate, and a jam-nut also threaded upon the body portion of the socket to bear against the inner edge of the adjusting-nut, substantially as specified.

In testimony that we claim the foregoing as our own we have hereto affixed our signatures in the presence of two witnesses.

AUGUST JOHNSON.
     JOHN D. CAHILL.

Witnesses:
 C. P. TAYLOR,
 MONROE THORP.